(12) United States Patent
Altunyurt et al.

(10) Patent No.: US 9,522,604 B2
(45) Date of Patent: Dec. 20, 2016

(54) INDUCTIVE WIRELESS POWER TRANSFER SYSTEM HAVING A COUPLER ASSEMBLY COMPRISING MOVEABLE PERMEABLE PANELS

(71) Applicant: FORD GLOBAL TECHNOLOGIES, LLC, Dearborn, MI (US)

(72) Inventors: Nevin Altunyurt, Ann Arbor, MI (US); Richard William Kautz, North Branch, MI (US); Sandeep Kamalakar Reddy Chandra, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 14/450,558

(22) Filed: Aug. 4, 2014

(65) Prior Publication Data
US 2016/0031331 A1 Feb. 4, 2016

(51) Int. Cl.
| | |
|---|---|
| B60T 11/18 | (2006.01) |
| B60L 11/18 | (2006.01) |
| H02J 5/00 | (2016.01) |
| H02J 7/02 | (2016.01) |

(52) U.S. Cl.
CPC .......... B60L 11/182 (2013.01); B60L 11/1829 (2013.01); B60L 11/1838 (2013.01); B60L 11/1851 (2013.01); B60L 11/1861 (2013.01); H02J 5/005 (2013.01); H02J 7/025 (2013.01); *Y02T 10/7005* (2013.01); *Y02T 90/125* (2013.01)

(58) Field of Classification Search
CPC .............................. Y02T 90/123; Y02T 90/125

USPC .................................................. 320/107–109
See application file for complete search history.

(56) References Cited

U.S. PATENT DOCUMENTS

| | | | | |
|---|---|---|---|---|
| 4,031,449 | A * | 6/1977 | Trombly | H02J 7/022 320/108 |
| 6,331,744 | B1 * | 12/2001 | Chen | A61N 1/08 310/171 |
| 6,906,495 | B2 * | 6/2005 | Cheng | H01F 3/02 320/108 |
| 7,211,986 | B1 | 5/2007 | Flowerdew et al. | |
| 7,248,017 | B2 * | 7/2007 | Cheng | H01F 38/14 320/108 |
| 7,272,483 | B2 | 9/2007 | Boenker, IV et al. | |
| 7,525,283 | B2 * | 4/2009 | Cheng | H01F 3/02 320/108 |
| 7,714,537 | B2 * | 5/2010 | Cheng | H01F 3/02 320/108 |
| 8,611,815 | B2 | 12/2013 | Mohammadian et al. | |
| 8,796,990 | B2 * | 8/2014 | Paparo | H01F 38/14 307/104 |
| 8,933,663 | B2 * | 1/2015 | Elias | 320/108 |
| 9,161,484 | B2 * | 10/2015 | Baarman | H05K 9/002 |
| 9,178,369 | B2 * | 11/2015 | Partovi | H02J 7/025 |
| 9,272,631 | B2 * | 3/2016 | Bendicks | B60L 11/182 |

(Continued)

*Primary Examiner* — Stacy Whitmore
(74) *Attorney, Agent, or Firm* — David B. Kelley; Brooks Kushman P.C.

(57) ABSTRACT

A vehicle includes an inductive charge coupling arrangement that can be electrically connected with a traction battery. The arrangement includes a charge coil and a plurality of permeable panels surrounding the charge coil. The vehicle further includes at least one controller that, in response to an inductive charge request, causes the panels to move to positions selected to minimize electromagnetic field leakage between the charge coil and a charge station.

15 Claims, 7 Drawing Sheets

(56) References Cited

U.S. PATENT DOCUMENTS

| | | | | |
|---|---|---|---|---|
| 2002/0069749 A1* | 6/2002 | Hoover | ............... | G10H 3/26 84/738 |
| 2005/0116683 A1* | 6/2005 | Cheng | ............... | H01F 3/02 320/108 |
| 2006/0076922 A1* | 4/2006 | Cheng | ............... | H01F 38/14 320/108 |
| 2006/0237268 A1* | 10/2006 | Yajima | ............... | H02K 41/03 188/164 |
| 2008/0116847 A1* | 5/2008 | Loke | ............... | H02J 7/025 320/108 |
| 2009/0189565 A1* | 7/2009 | Cheng | ............... | H01F 3/02 320/108 |
| 2009/0284220 A1 | 11/2009 | Toncich et al. | | |
| 2010/0201201 A1 | 8/2010 | Mobarhan et al. | | |
| 2011/0204845 A1* | 8/2011 | Paparo | ............... | H01F 38/14 320/108 |
| 2012/0019057 A9 | 1/2012 | Kirby et al. | | |
| 2012/0112552 A1* | 5/2012 | Baarman | ............... | H05K 9/002 307/104 |
| 2012/0293116 A1* | 11/2012 | Tate, Jr. | ............... | B60L 11/1829 320/108 |
| 2013/0009594 A1* | 1/2013 | Osswald | ............... | H02J 7/025 320/108 |
| 2013/0024059 A1* | 1/2013 | Miller | ............... | H01F 38/14 701/22 |
| 2013/0033224 A1* | 2/2013 | Raedy | ............... | H02J 7/025 320/107 |
| 2013/0249480 A1* | 9/2013 | Paparo | ............... | H01F 38/14 320/108 |
| 2013/0285605 A1* | 10/2013 | Partovi | ............... | H02J 7/0042 320/108 |
| 2014/0139181 A1* | 5/2014 | Elias | ............... | B60L 11/1811 320/108 |
| 2014/0217830 A1* | 8/2014 | Jeon | ............... | B60L 5/005 307/104 |
| 2014/0217966 A1* | 8/2014 | Schneider | ............... | B60L 11/182 320/108 |
| 2014/0285144 A1* | 9/2014 | Toya | ............... | H02J 7/025 320/108 |
| 2014/0312832 A1* | 10/2014 | Wu | ............... | H01F 38/14 320/108 |
| 2015/0061585 A1* | 3/2015 | Obayashi | ............... | H01F 27/38 320/108 |
| 2015/0123609 A1* | 5/2015 | Niizuma | ............... | B60L 11/182 320/108 |
| 2015/0170829 A1* | 6/2015 | Waffenschmidt | ............... | H01F 27/365 320/108 |
| 2015/0210170 A1* | 7/2015 | Oyobe | ............... | B60L 5/005 320/108 |
| 2015/0270719 A1* | 9/2015 | Kurs | ............... | H02J 5/005 320/108 |
| 2015/0326064 A1* | 11/2015 | Toya | ............... | H02J 7/025 320/108 |
| 2015/0372498 A1* | 12/2015 | Ichikawa | ............... | B60L 11/1803 307/104 |
| 2016/0025821 A1* | 1/2016 | Widmer | ............... | G01R 33/0047 324/258 |
| 2016/0036253 A1* | 2/2016 | Keller | ............... | B60L 11/1816 320/108 |
| 2016/0039305 A1* | 2/2016 | Yamamoto | ............... | B60L 5/005 318/139 |

\* cited by examiner

INDUCTIVE WIRELESS POWER TRANSFER SYSTEM HAVING A COUPLER ASSEMBLY COMPRISING MOVEABLE PERMEABLE PANELS

TECHNICAL FIELD

Described herein are wireless power transfer systems and methods.

BACKGROUND

Wireless power transfer (WPT) systems can transfer power through free space from transmitting units to receiving units. WPT systems may be used to charge electric vehicles, as well as charging mobile devices, medical devices, etc. Some wireless power transfer systems can utilize inductive power transfer where power is transferred through magnetic coupling between two magnetic field coupling units (i.e., a primary coupler and a secondary coupler). These coupling units generally include single or multiple windings of electric current carrying material, typically Litz wire, which may be configured to create different magnetic flux distributions.

The application of wireless power transfer for electric vehicle charging may generate magnetic field exposure to the surrounding area of the vehicle affecting overall system efficiency. One of the key factors in determining the overall system efficiency is the quality of the magnetic field coupling between the primary and secondary couplers. System efficiency can be improved by improving the magnetic field coupling between the primary and secondary coils. The amount of human exposure to magnetic fields generated by the inductive wireless power transfer is dependent on the field strength. The fields generated by the inductive WPT system are reactive near fields and typically field strength decays with the inverse cube of distance from the coupler. Even though fields from the inductive WPT system decay quickly with distance, it may be desirable to minimize the field strength in human accessible locations.

SUMMARY

A charging system for a vehicle includes a charge coil and a coupling assembly associated with the charge coil. The coupling assembly includes at least one permeable panel and at least one controller configured to, in response to an inductive charge request, command the coupling assembly to adjust the at least one permeable panel to one of a plurality of predefined positions selected to minimize electromagnetic field leakage during charge.

A battery charging method includes, in response to receiving charge-state data indicative of a magnetic field between primary and secondary inductive coupling assemblies, outputting a desired position for one of the assemblies based on the data and commanding a coupler to move a permeable panel of the one of the assemblies to the desired position. The desired position is associated with a minimum electromagnetic field leakage state between the assemblies.

A vehicle having a traction battery includes an inductive charge coupling arrangement configured to be electrically connected with the traction battery. The arrangement includes a charge coil and a plurality of permeable panels surrounding the charge coil. The vehicle further includes at least one controller configured to, in response to an inductive charge request, cause the panels to move to positions selected to minimize electromagnetic field leakage between the charge coil and a charge station.

DETAILED DESCRIPTION

Embodiments of the present disclosure are described herein. It is to be understood; however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Wireless power transfer for electric vehicles may be implemented in public charging stations. These charging stations may be installed in parking lots, public garages, etc., to enable frequent charging of electric cars to improve their driving range and usability. The wireless power transfer is a contactless power transfer method utilizing inductive coupling between two magnetically coupled coil systems. These systems may provide a convenient way of charging a vehicle; however, they may not be as efficient when compared to a plug-in charging station. The quality of the magnetic coupling between a primary coil assembly (e.g., charging station) and a secondary coil assembly (e.g., vehicle coil assembly) is one of the key factors in determining overall system efficiency of the wireless power transfer system. Improving magnetic coupling can help boost the efficiency while reducing leakage electromagnetic fields.

Described herein is a wireless power transfer system that allows a charging station to effectively and efficiently wirelessly charge a vehicle having a coupler enhancement feature configured to decrease the leakage fields. The wireless power transfer system may be configured to wirelessly transmit power from the primary coil assembly having a primary coupler to the secondary coil assembly having a secondary coupler using the coupler enhancement feature. The coupler enhancement feature may include an additional structure comprising movable lids attached to at least one of the coil assemblies (e.g., couplers). In another embodiment, the coupler enhancement feature may include an additional structure configured with both coil assemblies. The position of the lids at the coupler may be adjusted to catch and direct the magnetic flux generated by the primary coupler. The movable lids may be implemented as a part of a closure system for the secondary coupler (e.g., attached to the vehicle), in which the lids are attached to the side of the secondary coupler on a pivot mechanism to enable an open and close position for the lids. For example, when the vehicle is in a non-charging state, the lids may cover the secondary coupler protecting it from the exterior environment. When the vehicle is in a charging state, the lids may open and their position may be adjusted for optimum coupling between the primary and secondary couplers.

In one embodiment, the movable lids may be implemented as part of a closure system for the primary coupler at the charging station. For example, when the vehicle is positioned above the charging station, the lids (e.g., panels) may open and adjust to a position optimal for coupling between the primary and secondary couplers. In another embodiment, the primary and secondary couplers may both have the coupler enhancement feature. For example, when the vehicle (e.g., secondary coupler) is positioned above the charging station (e.g., primary coupler), the vehicle coupler enhancement feature and the charging station enhancement feature may position their respective panels to a position optimal for coupling between the coupler pair.

Figure 1:
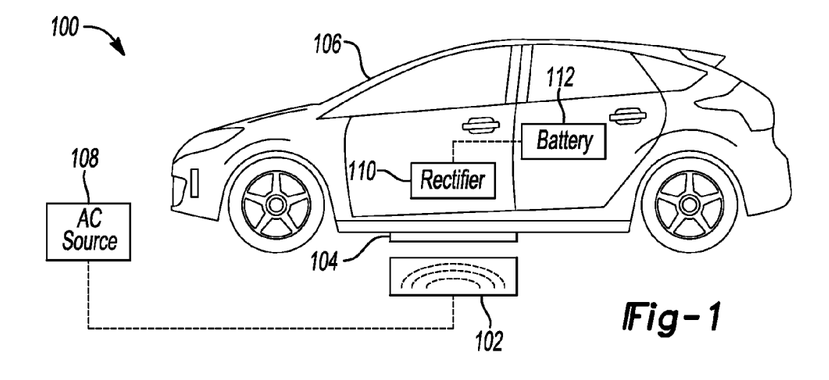
FIG. 1 is an exemplary wireless power transfer system.

FIG. 1 is an exemplary wireless power transfer system 100 showing a primary coil assembly 102 and a secondary coil assembly 104 for a vehicle 106 charge mode. The primary coil assembly 102 may be connected to an external radio frequency (RF) power source 108. The vehicle 106 may include a rechargeable battery 112 and a rectifier assembly 110 attached thereto. The rectifier 110 may be connected to the secondary coil assembly and configured to transmit electrical current from the secondary coil assembly 104 to the battery 112 in order to charge the battery 112. The primary and secondary coil assemblies 102, 104 are described in more detail below. Each may include at least one coil (e.g., primary coil 102, and secondary coil 104). The coil of the primary coil assembly 102 may be coupled to a secondary coil of the secondary coil assembly 104. As current flows through the primary coil (not shown in FIG. 1), the energy emitted from the primary coil may be received at the secondary coil, which is in turn used to charge the battery.

Figure 2A:
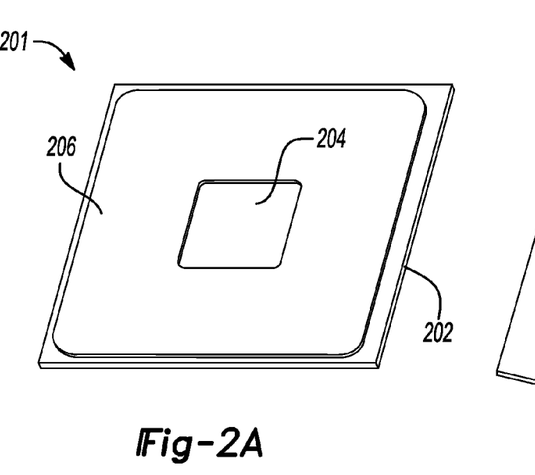
FIGS. 2A-2B are exemplary embodiments of coil assemblies for the inductive wireless power transfer system.
Figure 2B:
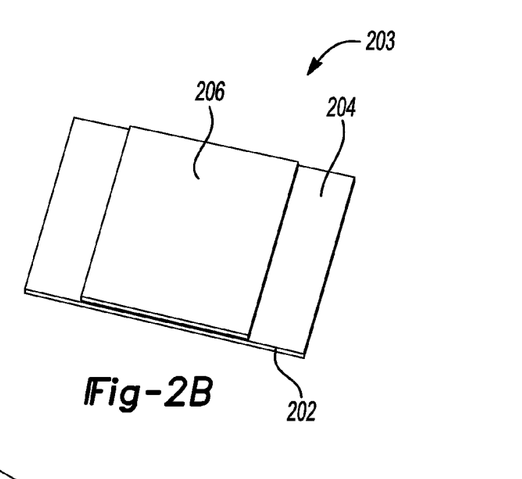

FIGS. 2A and 2B are exemplary embodiments of coupler assemblies illustrating main components of typical coupler topologies proposed for inductive wireless power transfer systems. The coupler enhancement feature may be configured with a conventional solenoidal polarized coupler model and/or other types of conventional coupler topologies. The coupler topology may require the enhancement feature to be designed with additional components (e.g., one or more arms, panels, and/or lids) to improve the system efficiency. For example a coupler topology, such as frame 201 and solenoidal 203, may require the enhancement feature to be configured with one or more panels, also called an arm and/or lid.

The primary coil assembly 102 may include a backing plate 202, a ferrite pad 204, and a coil or coils 206 to produce magnetic fields from the power source currents. The backing plate 202 may be constructed of aluminum or some other non-magnetic, highly conductive material. The ferrite pad 204 may include a plurality of ferrite pads. The pad 204 may be configured to guide the magnetic flux through the primary coil(s) 206 and between the magnetic poles of the coupler, from which the fields enter/exit and are linked to the secondary coupler at the secondary coil assembly 104. The backing plate 202 may create a shield for a magnetic field created between the coupled coils. Such a shield may also improve coupling by directing the magnetic field towards the secondary coil assembly 104.

The coils 206 may include a copper winding coil arranged with the ferrite pad 204. The coils 206 may form a continuous ring-like shape defining a coil opening. For example, the coils 206 may form a circular shape, or may have straight sides forming a quadrilateral shape. The coils 206 may be comprised of copper wire. As current is supplied to the coils 206 a magnetic field may be created between the primary coil assembly 102 and the secondary coil assembly 104.

In another embodiment, a manufactured coupler pair may include capacitors (not shown) integrated to the coupler package. In the manufactured coupler pair, couplers may also be enclosed with plastic packaging to provide protection.

Figure 3:
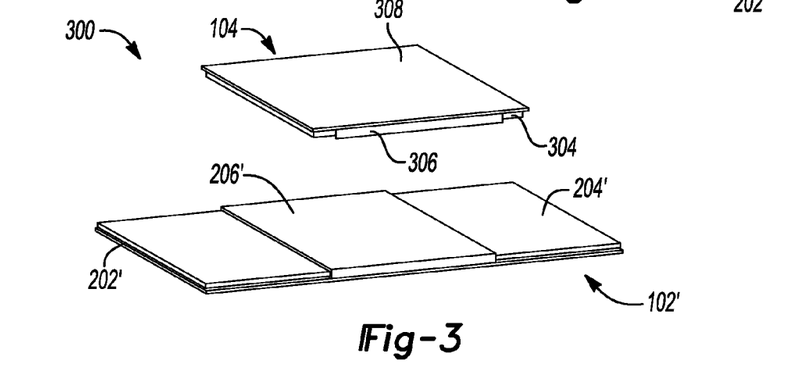
FIG. 3 is an exemplary embodiment of a polarized coupler pair having a coil assembly over a charge station coil assembly.

FIG. 3 is an exemplary embodiment of a solenoidal polarized coupler pair 300 having the coil assembly 104 (e.g., secondary coil assembly) over the charge station coil assembly 102' (e.g., primary coil assembly). The coupler model 300 comprises the primary coil assembly 102' having a winding coil 206' arrangement encircling the ferrite pad 204'. The primary coil assembly 102' may create a magnetic field when current is applied to the coil 206'. The secondary coil assembly 104 may be positioned over the primary coil assembly 102' to receive the energy emitted from the primary coil. The secondary coil assembly 104 may include a copper winding coil 306 encircling ferrite pad 304. The secondary coil assembly 104 may include a non-magnetic highly conducting metal shield 308 above the ferrite pad 304 to protect the vehicle from the magnetic field created between the coupled coils.

Figure 4:
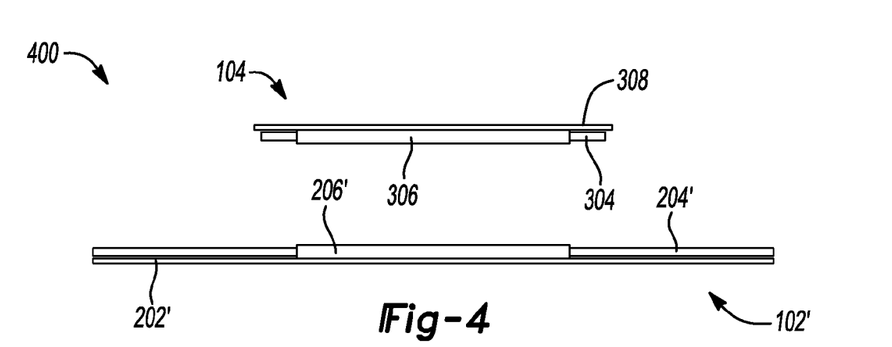
FIG. 4 is a cross sectional view of FIG. 3.

FIG. 4 is a cross sectional view 400 of FIG. 3. The cross section view 400 of the polarized coupler model provides an illustration of the positioning of the secondary coil assembly 104 over the primary coil assembly 102'. The positioning of the polarized coupler pair may improve and/or deteriorate leakage fields of the magnetic flux distribution during a charge event.

Figure 5:
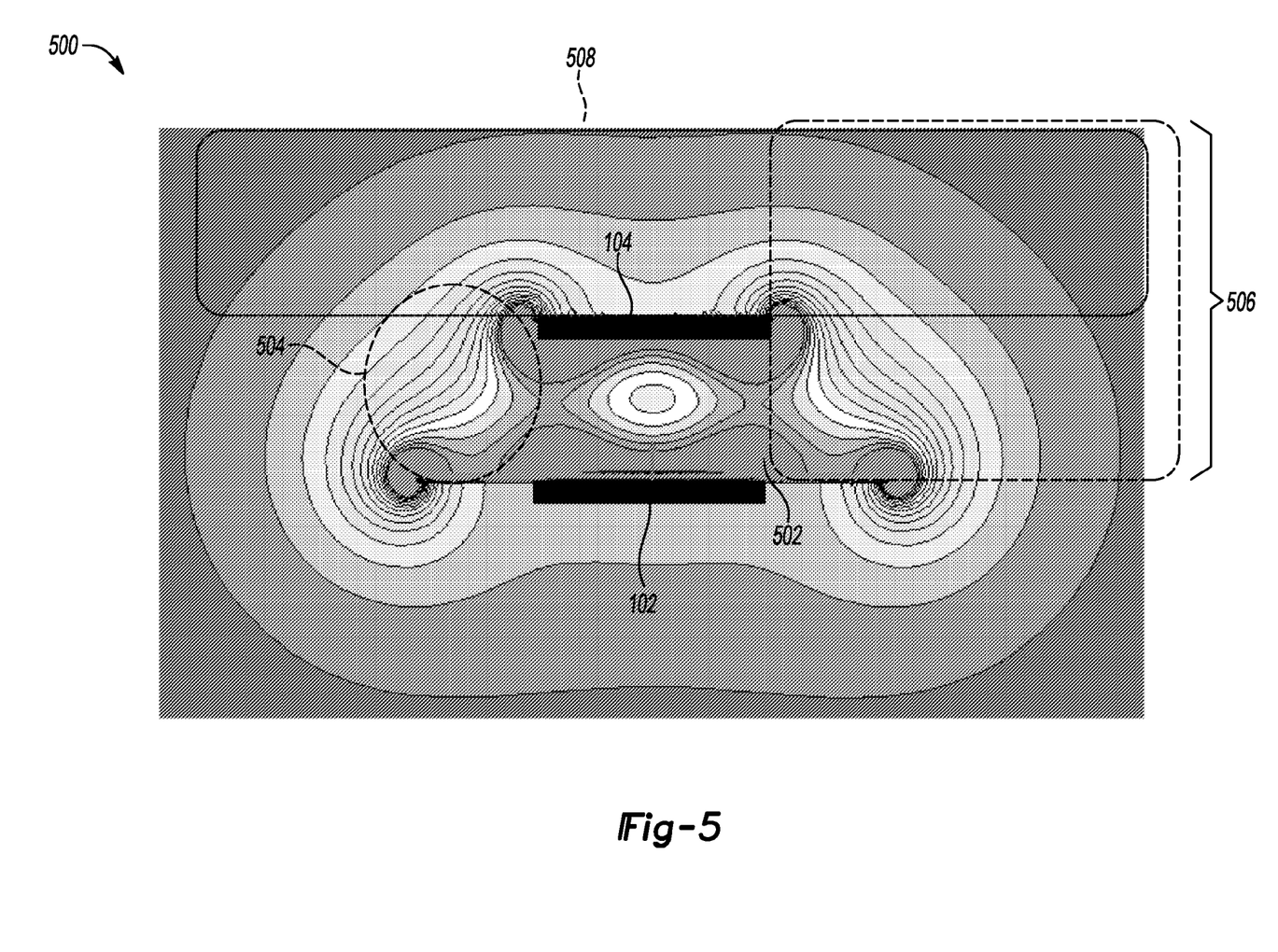
FIG. 5 is an exemplary magnetic field illustrating magnetic field distribution between and around the polarized coupler pair.

FIG. 5 is an exemplary magnetic field diagram 500 illustrating magnetic field distribution between and around the polarized coupler pair. The primary coil assembly 102 may have energy emitted from the primary coils to the secondary coil assembly 104 as shown in the magnetic field diagram 500.

The field distribution from the coupler pair may have an electromagnetic field (EMF) exposure to the surrounding areas of the coupler pair based on the field leakage area 506. The EMF field leakage may cause excessive heating of metallic vehicle parts to an area 508 above the secondary coupler assembly 104. The coupler enhancement feature may improve the magnetic coupling between the couplers while decreasing leakage fields in the areas/directions of concern. The coupler enhancement feature may relay one or more a critical coupling areas 504 between the primary and secondary coil assemblies to decrease leakage fields.

Figure 6:
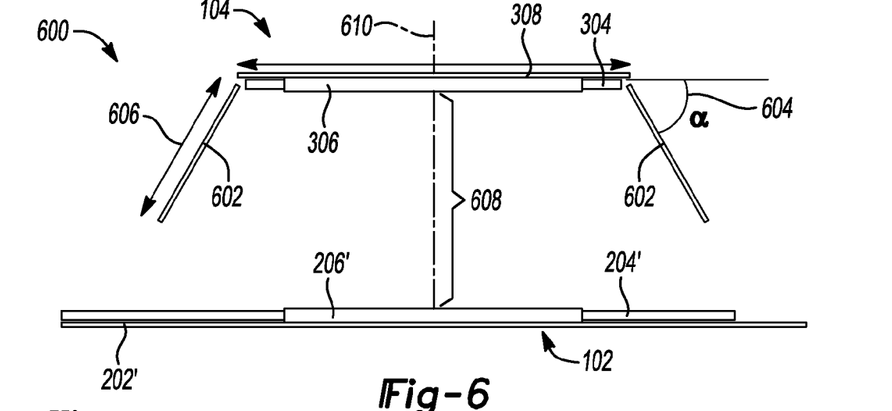
FIG. 6 is an exemplary embodiment of a coupler enhancement assembly configured with the coil assembly.

FIG. 6 is an exemplary embodiment of a cross section view 600 of a coupler enhancement assembly 602 configured with the secondary coil assembly 104. The coupler enhancement assembly 602 may comprise two arms that extend from the secondary coil assembly 104 for decreasing the leakage fields while optimizing the magnetic coupling between the primary coil 102 and the secondary coil assembly 104. In one embodiment, the two arms may be controlled by a motor allowing the arms to be put into the predefined position above the primary coil assembly 102. The motor may receive commands from one or more processors in communication with a vehicle computing system. The vehicle computing system may comprise software and hardware required to control the coupler enhancement assembly 602.

In another embodiment, the arms may be controlled by a pneumatic and/or hydraulic device(s) used to position the arms to the predefined position above the primary coil assembly 102. The vehicle computing system may transmit one or more commands to control the pneumatic and/or hydraulic device(s). The one or more arms may include a high magnetic permeability material including, but not limited to, ferrite. The one or more arms may be positioned at a certain angle and/or have a certain length, width, and thickness to improve charging while reducing EMF to the surrounding area of the coupler pair.

For example, the vehicle having a secondary coil assembly 104 may drive over a primary coil assembly 102, thereby positioning the coupler pair to begin wireless charging of the vehicle battery. Before charging begins, the coupler enhancement assembly 602 may arrange the one or more arms such that the energy emitted from the primary coil assembly is directed to the secondary coil assembly while reducing leakage fields.

In another example, the system may adjust the one or more arms during the charging state. The system may continuously monitor feedback variable(s) to modify the coupler enhancement assembly 602 during the charge state. The monitoring of the feedback variables during the charge state may improve system efficiency and reduce leakage fields. The feedback variable(s) may include, but are not limited to, one or more sensors, one or more algorithms, and/or a combination thereof to calculate the magnetic flux generated by the primary coil.

The coupler enhancement assembly 602 may have an electric motor used for positioning the arm(s) at a certain angle 604 to improve a coupling coefficient. The coupling coefficient, k, is a measure of how well the magnetic flux generated by the primary coil is captured by the secondary coil. As it is shown in Table 1, the coupling coefficient may be increased considerably by adjusting the position of the one or more arms by changing the angle (i.e., alpha). The angle to adjust the one or more arms may be based on several variables including, but not limited to, the distance between the secondary and primary coil assembly, the length of the arms, the material of the arms (e.g., ferrite), and/or the position of the center of the secondary coil assembly compared to the center of the primary coil assembly.

TABLE 1

| Length | Alpha (deg) | k |
| --- | --- | --- |
| No Coupler Enhancement Feature | | 0.173 |
| 100 mm | 20 | 0.206 |
| 100 mm | 30 | 0.216 |
| 100 mm | 40 | 0.227 |
| 100 mm | 50 | 0.239 |
| 100 mm | 60 | 0.25 |
| 100 mm | 70 | 0.26 |
| 120 mm | 50 | 0.256 |
| 50 mm | 50 | 0.2 |

For example, as illustrated in FIG. 6, the distance 608 between the primary coil assembly 102 and the secondary coil assembly 104 is 250 mm. In this example, the positioning 610 (e.g., alignment) between the coupler pair is the center of the secondary coil assembly 104 aligned with the center of the primary coil assembly 102. Based on the distance 608 and position 610 of the coupler pair in relation to each other, the coupler enhancement assembly 602 may adjust the two arms to a length 606 of 100 mm and an angle 604 of 70 degrees to receive the maximum coupling coefficient value of 0.26.

In another embodiment, the length of the arms may be adjusted based on the several variables used to determine the optimal position of the arms before charging begins. For example, the arms may be configured to have telescoping abilities to adjust the length 606 from the secondary coil to the end of the arm(s). As shown in Table 1 above, the arms of the coupler enhancement device 602 may have an initial length of 50 mm to a value of 120 mm. In another embodiment, the arms may be preconfigured to have a fixed length (e.g., 100 mm) and/or a fixed width (e.g., 150 mm).

Figure 7A:
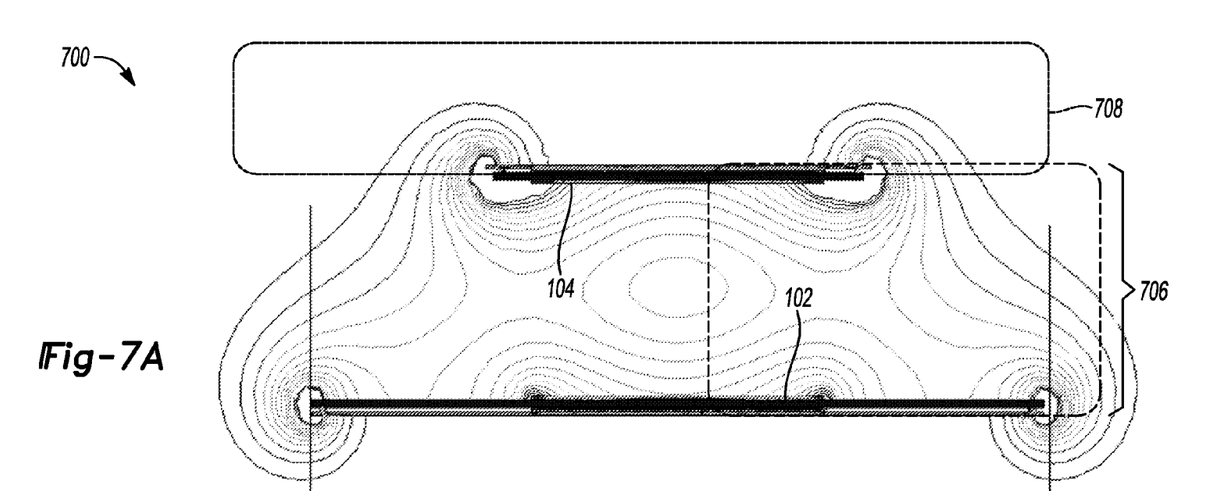
FIGS. 7A-7B are exemplary magnetic field diagrams comparing the leakage fields distribution from the polarized coupler pair with and without the coupler enhancement assembly.
Figure 7B:
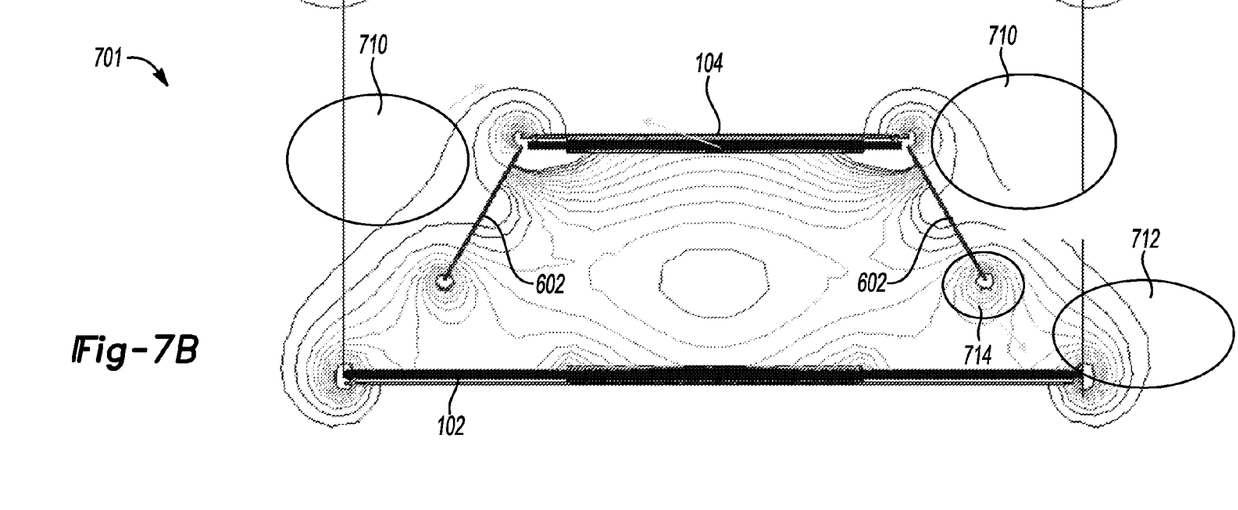

FIGS. 7A-7B are exemplary magnetic field diagrams comparing the leakage field distribution from the polarized coupler pair using the coupler enhancement assembly 602. FIG. 7A illustrates an exemplary magnetic field diagram 700 of the coupler pair not using the coupler enhancement assembly. The coupler pair may have a field leakage area 706 exposing EMF to the surrounding areas in response to energy being emitted from the primary coil assembly 102. The EMF field leakage may cause excessive heating of metallic vehicle components to an area 708 surrounding the secondary coil assembly 104.

FIG. 7B illustrates an exemplary magnetic field diagram 701 of the coupler pair using the coupler enhancement assembly 602. The coupler enhancement assembly 602 may be positioned to improve receiving of the energy emitted by the primary coil assembly 102 to the secondary coil assembly 104. The coupler enhancement assembly 602 may provide a pickup of magnetic fields 714 that may have been previously emitted to the surrounding areas of the coupler pair. The magnetic field diagram 701 illustrates lower EMF leakage areas 712 with the use of the coupler enhancement assembly 602. The use of the enhancement assembly 602 may reduce the EMF field leakage that may cause excessive heating of metallic vehicle parts to an area 710 surrounding the secondary coil assembly 104.

Figure 8A:
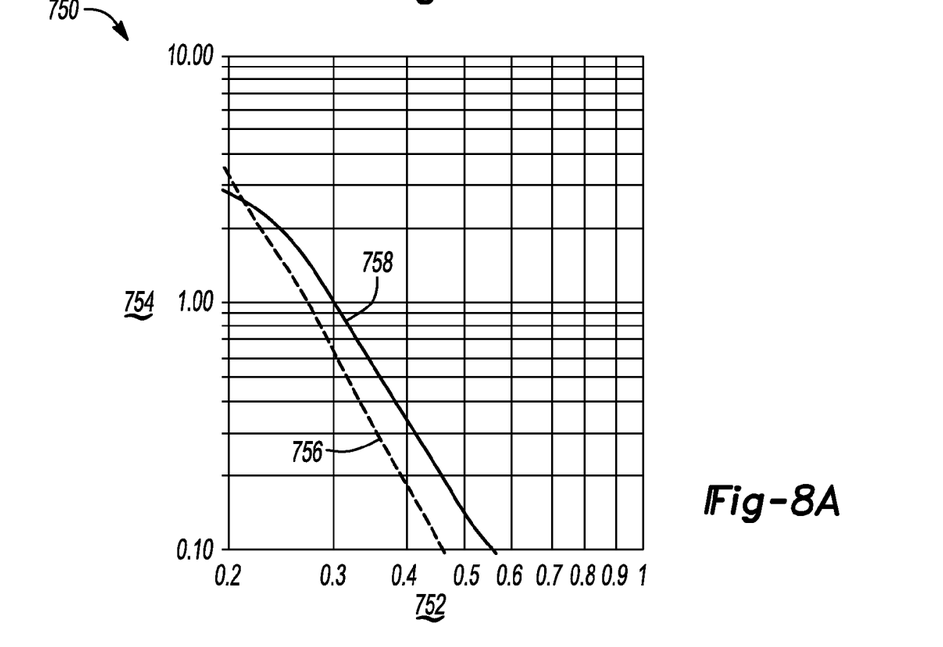
FIGS. 8A-8B are graphs illustrating the comparison of magnetic field decay with increasing distance from the center of the polarized coupler pair with and without the coupler enhancement assembly.
Figure 8B:
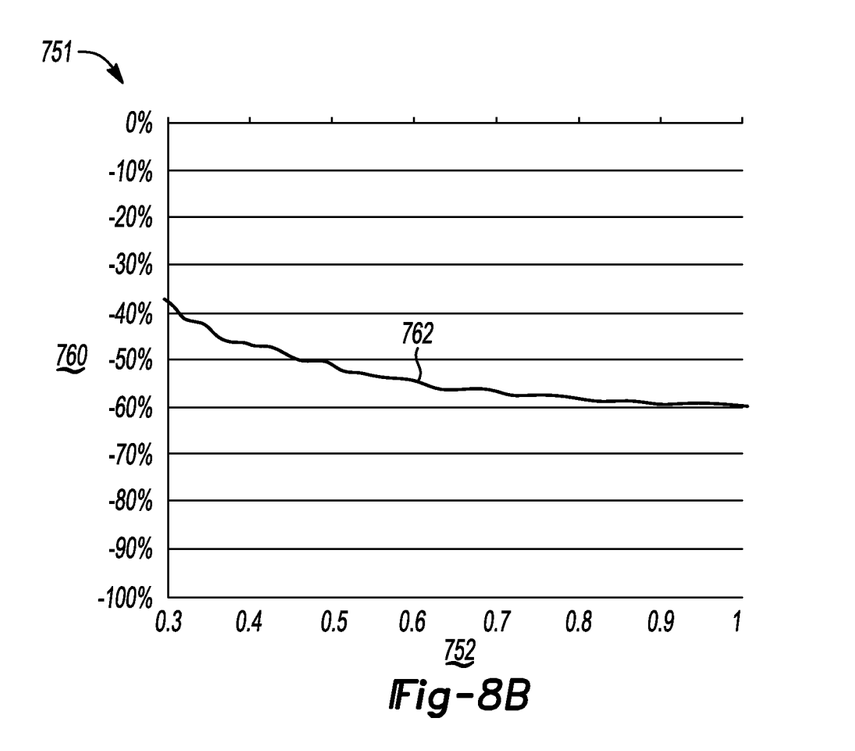

FIGS. 8A-8B are graphs depicting an exemplary illustration of magnetic field decay with increasing distance from the center of the polarized coupler pair. FIG. 8A is a graph 750 illustrating the magnetic field decay with increasing distance from the center of the polarized coupler pair with and without the coupler enhancement assembly. The graph 750 has an x-axis 752 representing distance from the center of the coupler pair measured in meters and a y-axis 754 representing the magnetic field amplitude measured in tesla units of measurement. The graph 750 illustrates that coupler pair data points 756 with the coupler enhancement assembly improves the leakage of EMF compared to coupler pair data points 758 without the coupler enhancement assembly.

FIG. 8B is a graph 751 illustrating the magnetic field distribution from the polarized coupler pair with the coupler enhancement assembly. The graph 751 has an x-axis 752 representing distance in meters from the center of the coupler pair and a y-axis 762 representing a percentage decrease in the magnetic field exposure when using the enhancement feature. The graph 751 illustrates that in one example the coupler enhancement assembly may decrease EMF exposure by decreasing the magnetic field magnitude by a value from 35 percent to 60 percent compared to without the coupler enhancement assembly.

Figure 9A:
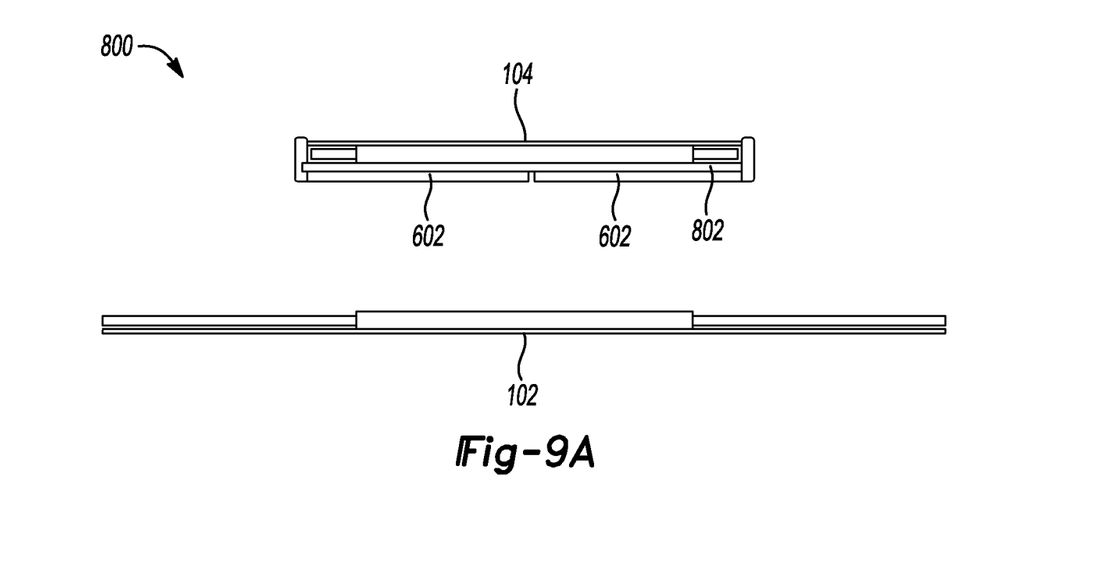
FIGS. 9A-9D are exemplary embodiments of the coupler enhancement assembly in a non-charging state and a charging state.

FIGS. 9A-9D are exemplary embodiments of the coupler enhancement assembly 602 in a non-charging state 800 and a charging state 801. FIG. 9A illustrates an exemplary embodiment of the coupler enhancement field 602 in the non-charging state 800. In this embodiment, the coupler enhancement assembly 602 is configured with the second coil assembly 104 enclosed with a plastic packaging cover and comprises two arms. The two arms form a lid that provides a cover over the secondary coupler assembly 104 in the non-charging state. In another example, the coupler enhancement assembly may include one or more arms that are fully open and positioned at the outer sides of the secondary coil assembly 104 during the non-charging state 800.

Figure 9B:
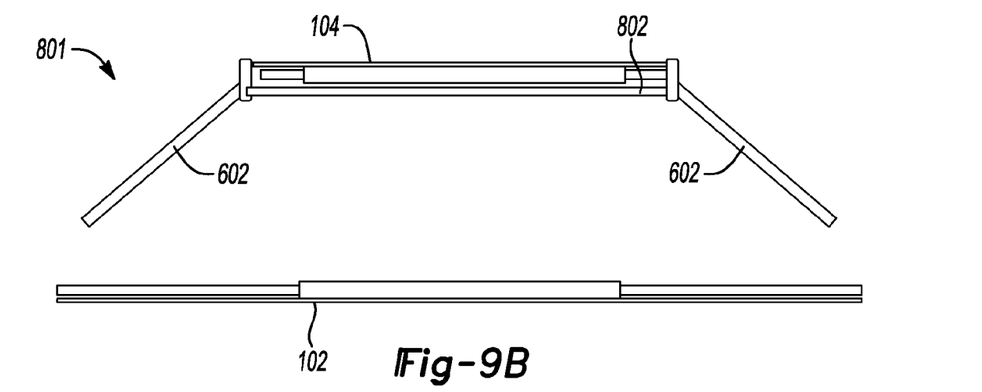

FIG. 9B illustrates an exemplary embodiment of the coupler enhancement assembly 602 in a charging state 801 (i.e., charge mode). The coupler enhancement assembly 602 may position the two arms at an angle over the primary coil assembly 102. The two arms may be controlled to a predefined calibratible position based on one or more variables. The one or more variables may include, but are not limited to, position of the secondary coil assembly 104 in relation to the primary coil assembly 102, distance between the secondary coil assembly 104 and primary coil assembly 102, and/or related environment conditions. The plastic packaging cover may provide protection to vehicle components inside the coupler unit during the charging state.

In another embodiment, the coupler enhancement assembly 602 may have one or more arms that are configured with the vehicle body associated with the secondary coil assembly 102. The one or more arms may be configured to have a charging position state over the primary coil assembly 102 such that the one or more arms are positioned to eliminate the leakage fields from the coupler pair. For example, the one or more arms may be controlled by a mechanical device (e.g., stepper motor) via a vehicle computing system to move the arm(s) to a predefined position based on several factors to improve charging of the vehicle battery.

Figure 9C:
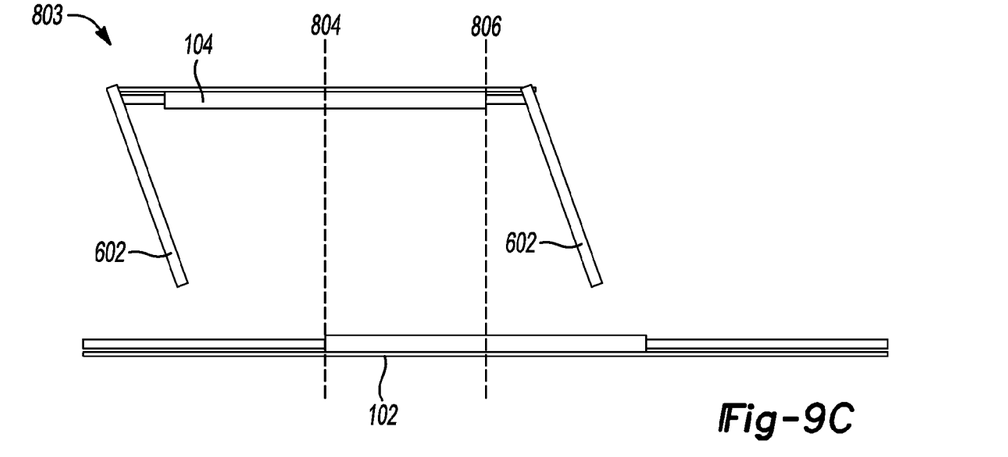

FIG. 9C illustrates an exemplary embodiment of the coupler enhancement assembly 602 in a misalignment operating charging state 803. In this example, the positioning between the coupler pair has an offset between the secondary coil assembly center position 804 and the primary coil assembly center position 806. In response to the offset, the coupler enhancement assembly 602 may arrange the one or more arms at a tilted position in the same direction to facilitate coupling of the secondary coil assembly 104 to the primary coil assembly 102.

Figure 9D:
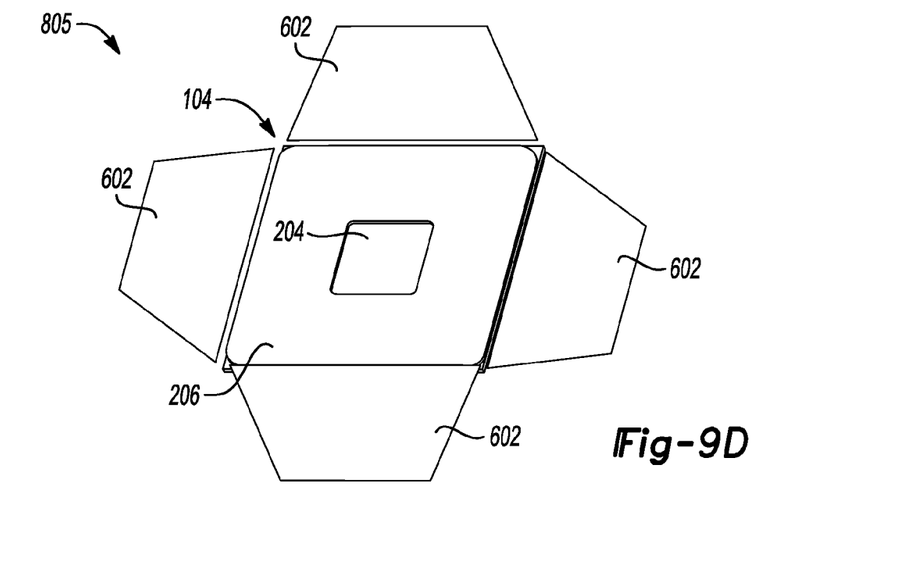

FIG. 9D illustrates an exemplary embodiment of the coupler enhancement assembly 602 in a non-charging state 800. In this embodiment, the coupler enhancement assembly 602 is configured to have four arms. The four arms may be attached to the frame coupler (e.g., rectangular spiral coupler) configuration having coils 206 arranged with the ferrite pad 204 positioned in the middle of the coil assembly 104. The four arms are fully opened and positioned at the outer sides of the secondary coil assembly 104 during a rectangular spiral coupler configuration non-charging state 805. The four arms may be controlled by the vehicle computing system transmitting a predefined calibratible position to a motor based on a charge mode request. The predefined calibratible position may be based on several factors including, but not limited to, distance between couplers, alignment between couplers, and/or a combination thereof.

Figure 10:
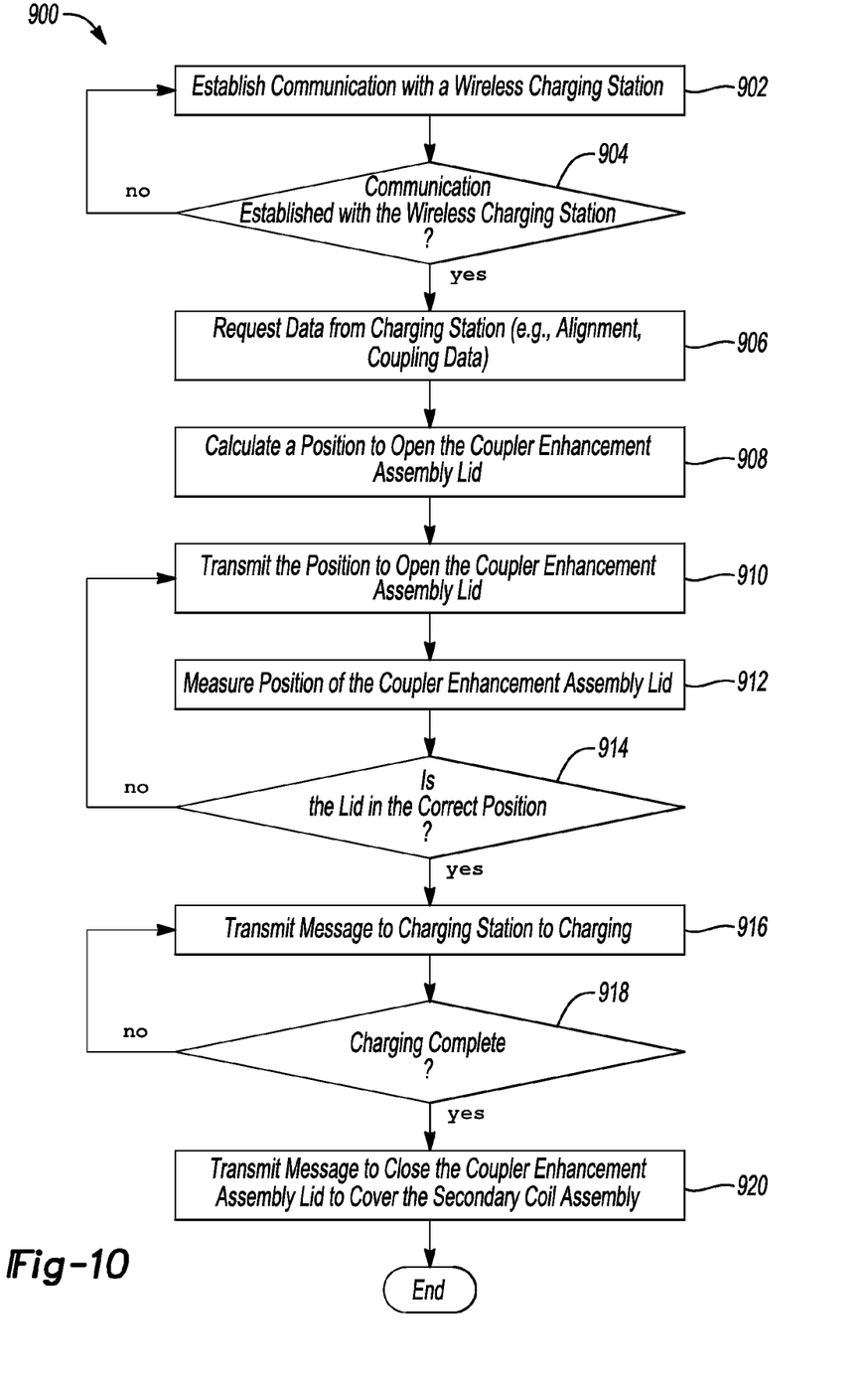
FIG. 10 is an exemplary flow chart for the wireless power transfer system.

FIG. 10 is an exemplary flow chart for the wireless power transfer system. The wireless power transfer system may comprise one or more applications executed on hardware at the system. The wireless power transfer system may comprise a processor in communication with the vehicle computing system. The one or more applications executed on the processor may include instructions to control one or more vehicle and/or charging station functions. The method 900 may be implemented using software code contained within the vehicle computing system and/or a charging station computing system. In other embodiments, the method 900 may be implemented in other vehicle controllers (e.g., processors), distributed amongst multiple vehicle controllers, and/or distributed between the vehicle controller and the charging station computing system.

Referring again to FIG. 10, the vehicle charging system and its components illustrated in FIG. 1, FIG. 2, FIG. 3, FIG. 6, and FIG. 9 are referenced throughout the discussion of the method 900 to facilitate understanding of various aspects of the present disclosure. The method 900 of controlling a vehicle charging event using a wireless charging station via a coupler pair link may be implemented through a computer algorithm, machine executable code, or software instructions programmed into a suitable programmable logic device (s) of the vehicle and/or charging station, such as the vehicle control module, the charging station control module, another controller in communication with the vehicle computing system and/or charging station control module, or a combination thereof. Although the various operations shown in the flowchart diagram 900 appear to occur in a chronological sequence, at least some of the operations may occur in a different order, and some operations may be performed concurrently or not at all.

In operation 902, the vehicle computing system may establish communication with a wireless charging station. The vehicle computing system may determine if communication has been established with the wireless charging station via one or more security handshakes in operation 904.

In operation 906, the vehicle computing system may request data from the charging station. For example, the vehicle computing system may request alignment data regarding the position of the secondary coil assembly compared to the primary coil assembly. In response to the alignment data, the vehicle computing system may calculate a position to open the coupler enhancement assembly lid in operation 908.

In one example, the vehicle computing system may calculate the position of the coupler enhancement assembly lid based on the received data from the charging station. The received data may include, but is not limited to, sensor data measuring distance, coupling coefficient, and/or position of the vehicle in relation to the primary coil assembly. In another example, the vehicle computing system may sweep through several positions via the steeper motor and tune the location based on the received data from the charging station.

In operation 910, the vehicle computing system may transmit a command to adjust the position of the coupler enhancement assembly lid. The vehicle computing system may comprise one or more sensors to measure the position of the lid for feedback control of the steeper motor in operation 912.

In operation 914, the vehicle computing system may determine if the lid (e.g., two arms) is in the correct position. If the lid is in the correct position, the vehicle computing system may transmit a message to the charging station to begin charging in operation 916. If the lid is in the incorrect position, the vehicle computing system may continue to control the lid until it is in the correct position via one or more calibratible tables. The one or more calibratible tables used to control the position of the lid may include several variables from the primary and secondary coil assembly. The several variables may include, but are not limited to, the magnetic coupling coefficient value, system efficiency value, primary and secondary RF current magnitude values, voltage magnitude values, phase angle values, and power converter input and output voltages and currents.

In operation 918, the vehicle computing system may determine if the charge mode is complete. The charge mode may be complete based on the battery state-of-charge, user requesting to end the charge, and/or the charging station requesting to terminate the charge. The vehicle computing system may receive a message that the charge mode is disabled. The vehicle computing system may transmit a message to close the coupler enhancement assembly lid to cover the secondary coil assembly once the charge mode is disabled.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A charging system for a vehicle comprising:
   a charge coil;
   a coupling assembly associated with the charge coil and including a permeable panel and a housing having at least two panels configured to cover the charge coil; and
   a processor configured to, in response to an inductive charge request, command the coupling assembly to adjust the permeable panel to one of a plurality of predefined positions selected to minimize electromagnetic field leakage during charge.

2. The system of claim 1, wherein the processor is further configured to, in response to a stop charge request, command the coupling assembly to cover the coil.

3. The system of claim 1, wherein the permeable panel is configured to expand in width.

4. The system of claim 3, wherein the coupling assembly further includes a hinge attached with the permeable panel, and a stepper motor configured to articulate the hinge.

5. The system of claim 1, wherein the processor is further configured to select the one of the plurality of predefined positions based on location data of the charge coil in relation to a charging station.

6. The system of claim 1, wherein the permeable panel is a ferrite panel.

7. A battery charging method comprising:
   in response to receiving charge-state data indicative of a magnetic field between primary and secondary inductive coupling assemblies, outputting a desired position for one of the assemblies based on the data, wherein the desired position is associated with a minimum electromagnetic field leakage state between the assemblies; and
   commanding a coupler to move a permeable panel of the one of the assemblies to the desired position, wherein the desired position is at least partially defined by a width of the permeable panel.

8. The method of claim 7, wherein the data includes a magnetic coupling coefficient, current magnitude, voltage magnitude, or phase angle.

9. The method of claim 7, wherein the desired position is at least partially defined by an angle for the permeable panel.

10. A vehicle including a traction battery comprising:
    an inductive charge coupling arrangement configured to be electrically connected with the traction battery, and including a charge coil and a plurality of permeable panels surrounding the charge coil; and
    a processor configured to, in response to an inductive charge request, cause the panels to move to positions selected to minimize electromagnetic field leakage between the charge coil and a charge station.

11. The vehicle of claim 10, wherein the processor is further configured to, in response to a stop charge request, cause the permeable panels to cover the charge coil.

12. The vehicle of claim 10, wherein at least one of the permeable panels is configured to expand in width.

13. The vehicle of claim 10, wherein the permeable panels are hinged about the charge coil.

14. The vehicle of claim 10, wherein the permeable panels are ferrite panels.

15. The vehicle of claim 10, wherein the arrangement further includes a stepper motor configured to move the panels.

\* \* \* \* \*